(12) United States Patent
Frank

(10) Patent No.: US 12,355,595 B2
(45) Date of Patent: Jul. 8, 2025

(54) DETERMINING A SIGNAL QUALITY USING AN ERROR VECTOR MAGNITUDE

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 229 days.

(21) Appl. No.: 17/998,860

(22) PCT Filed: May 15, 2021

(86) PCT No.: PCT/IB2021/054179
§ 371 (c)(1),
(2) Date: Nov. 15, 2022

(87) PCT Pub. No.: WO2021/229546
PCT Pub. Date: Nov. 18, 2021

(65) Prior Publication Data
US 2023/0198817 A1    Jun. 22, 2023

Related U.S. Application Data

(60) Provisional application No. 63/025,978, filed on May 15, 2020.

(51) Int. Cl.
*H04B 7/0413* (2017.01)
*H04L 25/03* (2006.01)

(52) U.S. Cl.
CPC ..... *H04L 25/03891* (2013.01); *H04B 7/0413* (2013.01)

(58) Field of Classification Search
CPC ............... H04L 25/03891; H04B 7/0413
See application file for complete search history.

(56) References Cited

U.S. PATENT DOCUMENTS

2013/0016793 A1* 1/2013 Dybdal ............... H01Q 21/26
375/259

OTHER PUBLICATIONS

PCT/IB2021/054179, "Notification of Transmittal of the International Search Report and the Written Opinion of the International Searching Authority, or the Declaration", International Searching Authority, Aug. 27, 2021, pp. 1-18.
Motorola Mobility, "EVM Definitions for Antenna Ports and MIMO Layers", 3GPPRAN4#94-e-Bis R4-2004791, Apr. 20-30, 2020, pp. 1-5.

(Continued)

*Primary Examiner* — Rahel Guarino
(74) *Attorney, Agent, or Firm* — Kunzler Bean & Adamson

(57) ABSTRACT

Apparatuses, methods, and systems are disclosed for determining a signal quality using an error vector magnitude. One method includes receiving an output of a user equipment antenna port. The user equipment antenna port includes a linear combination of two or more transmit antennas. The method includes performing normalized maximum ratio combining on the output of the user equipment antenna port to produce a normalized output. The method includes determining a signal quality of the output of the user equipment antenna port. Determining the signal quality includes determining an error vector magnitude using the normalized output.

20 Claims, 9 Drawing Sheets

(56) References Cited

OTHER PUBLICATIONS

Motorola Mobility, "On the Transmit EVM Requirement for UL MIMO Transmission", 3GPP TSG-RAN WG4 Meeting RAN4#95-e R4-2008057, May 25-Jun. 5, 2020, pp. 1-4.

Motorola Mobility, "Considerations on the EVM Definition for an Antenna Port or a Single MIMO Layer", 3GPP TSG-RAN WG4 Meeting RAN4#95-e R4-2008276, May 25-Jun. 5, 2020, pp. 1-5.

3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.3.1, Mar. 2020, pp. 1-170.

3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.3.0, Mar. 2020, pp. 1-332.

3GPP, "3rd Generation Partnership Project; Technical Specification Group Radio Access Network; Evolved Universal Terrestrial Radio Access (E-UTRA); User Equipment (UE) radio transmission and reception (Release 16)", 3GPP TS 36.101 V16.5.0, Mar. 2020, pp. Jan. 2030.

\* cited by examiner

DETERMINING A SIGNAL QUALITY USING AN ERROR VECTOR MAGNITUDE

CROSS-REFERENCE TO RELATED APPLICATIONS

This application claims priority to U.S. Patent Application Ser. No. 63/025,978 entitled "APPARATUSES, METHODS, AND SYSTEMS FOR ERROR VECTOR MAGNITUDE EVALUATION FOR ANTENNA PORTS AND MULTI-LAYER TRANSMISSIONS" and filed on May 15, 2020 for Colin D. Frank, which is incorporated herein by reference in its entirety.

FIELD

The subject matter disclosed herein relates generally to wireless communications and more particularly relates to determining a signal quality using an error vector magnitude.

BACKGROUND

In certain wireless communications networks, a signal quality may be determined. In such networks, there may be multiple antenna ports and/or multi-layer transmissions.

BRIEF SUMMARY

Methods for determining a signal quality using an error vector magnitude are disclosed. Apparatuses and systems also perform the functions of the methods. One embodiment of a method includes receiving an output of a user equipment antenna port. The user equipment antenna port includes a linear combination of two or more transmit antennas. In some embodiments, the method includes performing normalized maximum ratio combining on the output of the user equipment antenna port to produce a normalized output. In certain embodiments, the method includes determining a signal quality of the output of the user equipment antenna port. Determining the signal quality includes determining an error vector magnitude using the normalized output.

One apparatus for determining a signal quality using an error vector magnitude includes a receiver that receives an output of a user equipment antenna port. The user equipment antenna port includes a linear combination of two or more transmit antennas. In various embodiments, the apparatus includes a processor that: performs normalized maximum ratio combining on the output of the user equipment antenna port to produce a normalized output; and determines a signal quality of the output of the user equipment antenna port. Determining the signal quality includes determining an error vector magnitude using the normalized output.

Another embodiment of a method for determining a signal quality using an error vector magnitude includes receiving a multi-layer transmission. A number of transmission layers of the multi-layer transmission is greater than one. In some embodiments, the method includes applying a zero forcing multiple input multiple output matrix equalizer to the multi-layer transmission to result in a zero forced output vector. Each element of the zero forced output vector corresponds to a different layer. In certain embodiments, the method includes determining a signal quality of the multi-layer transmission. Determining the signal quality includes determining an error vector magnitude using the zero forced output vector.

Another apparatus for determining a signal quality using an error vector magnitude includes a receiver that receives a multi-layer transmission. A number of transmission layers of the multi-layer transmission is greater than one. In various embodiments, the apparatus includes a processor that: applies a zero forcing multiple input multiple output matrix equalizer to the multi-layer transmission to result in a zero forced output vector, wherein each element of the zero forced output vector corresponds to a different layer; and determines a signal quality of the multi-layer transmission. Determining the signal quality includes determining an error vector magnitude using the zero forced output vector.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
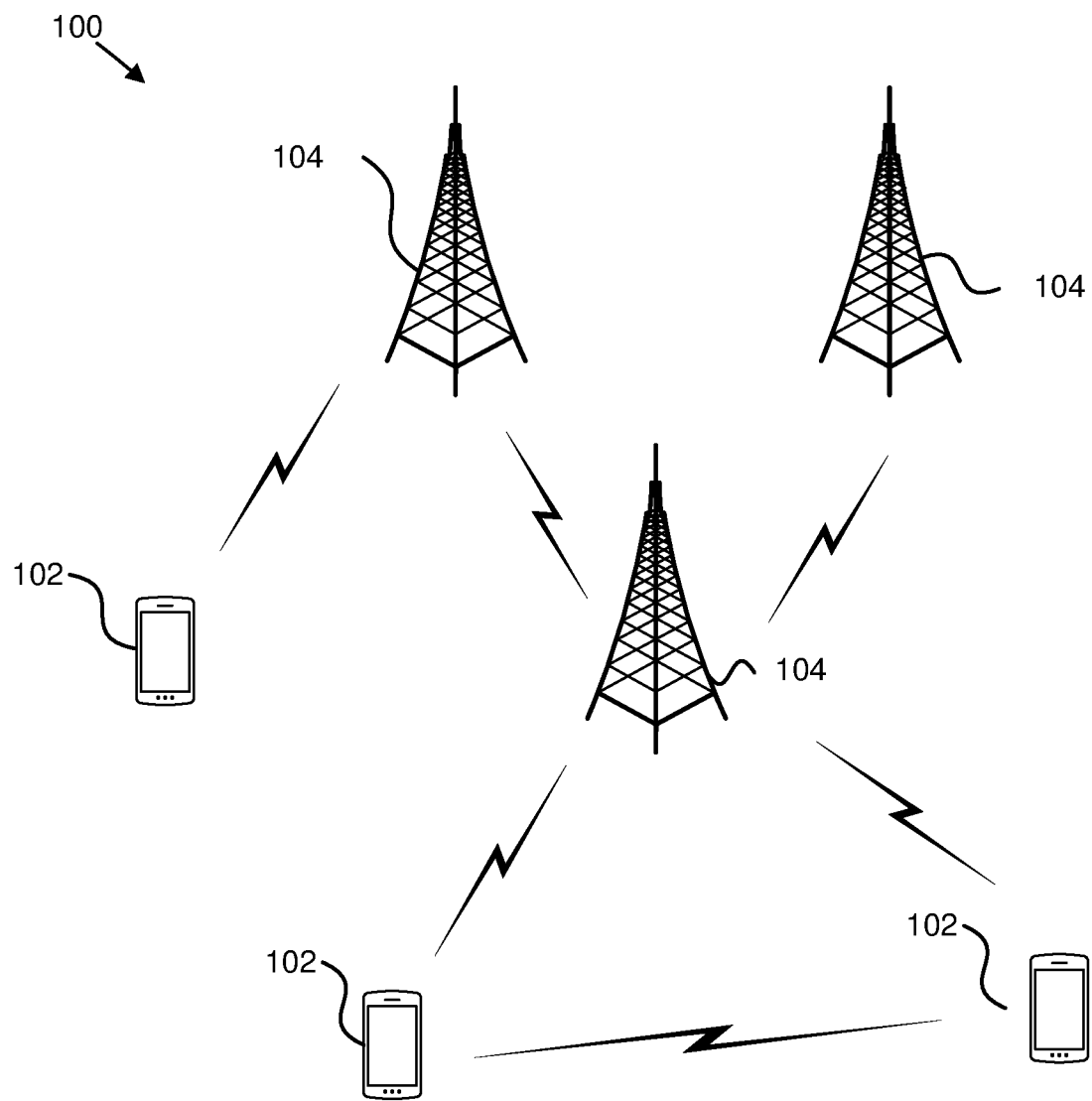
FIG. 1 is a schematic block diagram illustrating one embodiment of a wireless communication system for determining a signal quality using an error vector magnitude.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a signal quality using an error vector magnitude. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, a test equipment, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 (e.g., test equipment) may receive an output of a user equipment antenna port. The user equipment antenna port includes a linear combination of two or more transmit antennas. In some embodiments, the network unit 104 may perform normalized maximum ratio combining on the output of the user equipment antenna port to produce a normalized output. In certain embodiments, the network unit 104 may determine a signal quality of the output of the user equipment antenna port. Determining the signal quality includes determining an error vector magnitude using the normalized output. Accordingly, the network unit 104 may be used for determining a signal quality using an error vector magnitude.

In certain embodiments, a network unit 104 (e.g., test equipment) may receive a multi-layer transmission. A number of transmission layers of the multi-layer transmission is greater than one. In some embodiments, the network unit 104 may apply a zero forcing multiple input multiple output matrix equalizer to the multi-layer transmission to result in a zero forced output vector. Each element of the zero forced output vector corresponds to a different layer. In certain embodiments, the network unit 104 may determine a signal quality of the multi-layer transmission. Determining the signal quality includes determining an error vector magnitude using the zero forced output vector. Accordingly, the network unit 104 may be used for determining a signal quality using an error vector magnitude.

Figure 2:
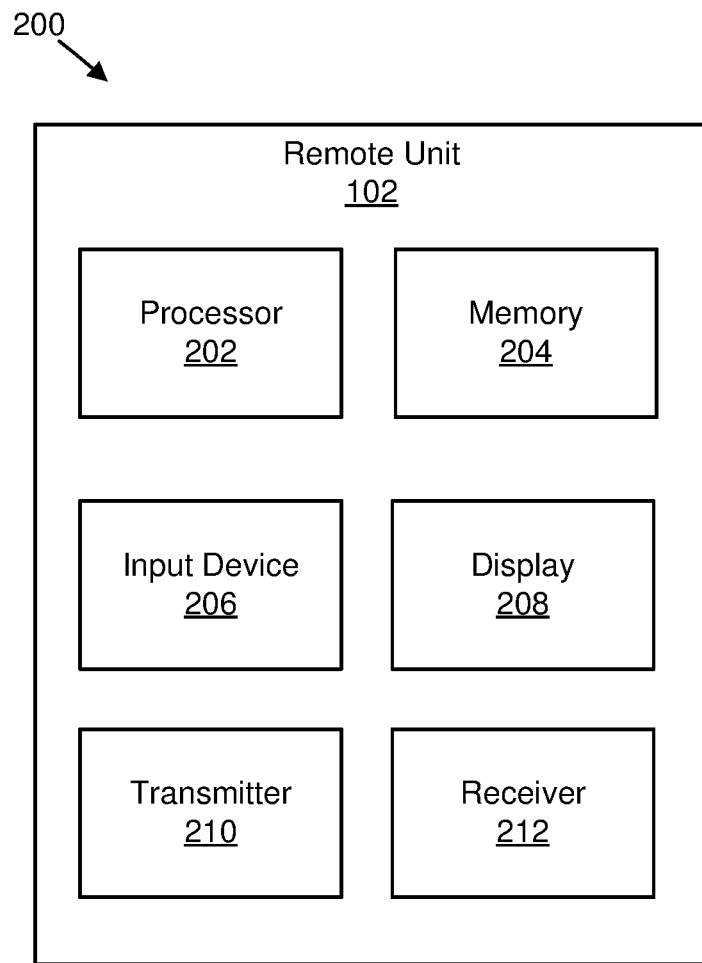
FIG. 2 is a schematic block diagram illustrating one embodiment of an apparatus that may be used for determining a signal quality using an error vector magnitude.

FIG. 2 depicts one embodiment of an apparatus 200 that may be used for determining a signal quality using an error vector magnitude. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
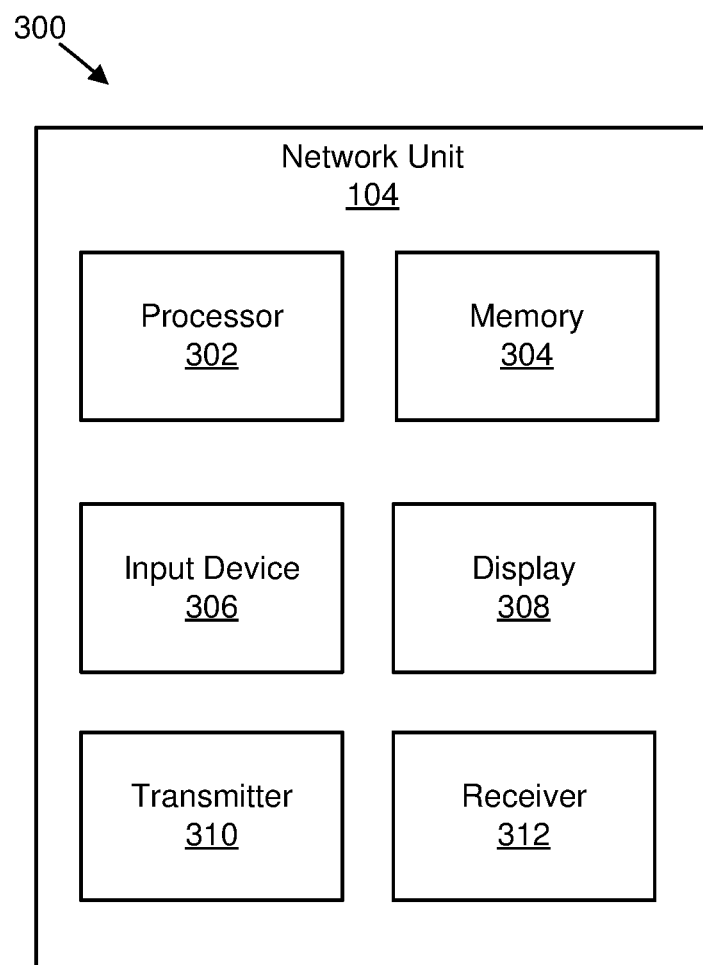
FIG. 3 is a schematic block diagram illustrating one embodiment of an apparatus that may be used for determining a signal quality using an error vector magnitude.

FIG. 3 depicts one embodiment of an apparatus 300 that may be used for determining a signal quality using an error vector magnitude. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 may receive an output of a user equipment antenna port. The user equipment antenna port includes a linear combination of two or more transmit antennas. In various embodiments, the processor 302: performs normalized maximum ratio combining on the output of the user equipment antenna port to produce a normalized output; and determines a signal quality of the output of the user equipment antenna port. Determining the signal quality includes determining an error vector magnitude using the normalized output.

In some embodiments, the receiver 312 receives a multi-layer transmission. A number of transmission layers of the multi-layer transmission is greater than one. In various embodiments, the processor 302: applies a zero forcing multiple input multiple output matrix equalizer to the multi-layer transmission to result in a zero forced output vector, wherein each element of the zero forced output vector corresponds to a different layer; and determines a signal quality of the multi-layer transmission. Determining the signal quality includes determining an error vector magnitude using the zero forced output vector.

In various embodiments, a fundamental quality metric of a signal transmission may be an error vector magnitude ("EVM"). The EVM may be defined as a normalized root-mean-square, expressed as a percentage, of a difference between an ideal modulated signal and a signal transmitted out of a transmitter. The EVM may be a fundamental limit on a signal-to-noise ratio of the transmission. A channel error rate may be a function of both a signal-to-noise ratio for which a lower bound is determined by the EVM, and a modulation constellation. For a given signal-to-noise ratio, a channel error rate increases as a size of the modulation constellation is increased. As a result, to achieve a given lower bound on the channel error rate, the EVM may be reduced as a size of the constellation is increased.

Table 1 illustrates one embodiment of minimum requirements for EVM, Table 2 illustrates requirements for EVM, and Table 3 illustrates another embodiment of minimum requirements for EVM. Table 1 includes parameters quadrature phase shift keying ("QPSK"), binary phase shift keying ("BPSK"), and quadrature amplitude modulation ("QAM").

TABLE 1

Minimum Requirements for Error Vector Magnitude

| Parameter | Unit | Average EVM Level | Reference Signal EVM Level |
|---|---|---|---|
| QPSK or BPSK | % | 17.5 | 17.5 |
| 16 QAM | % | 12.5 | 12.5 |
| 64 QAM | % | 8 | 8 |
| 256 QAM | % | 3.5 | 3.5 |

TABLE 2

Requirements for Error Vector Magnitude

| Parameter | Unit | Average EVM Level |
|---|---|---|
| Pi/2-BPSK | % | 30 |
| QPSK | % | 17.5 |
| 16 QAM | % | 12.5 |
| 64 QAM | % | 8 |
| 256 QAM | % | 3.5 |

TABLE 3

Minimum Requirements for Error Vector Magnitude

| Parameter | Unit | Average EVM level | Reference signal EVM level |
|---|---|---|---|
| Pi/2 BPSK | % | 30.0 | 30.0 |
| QPSK | % | 17.5 | 17.5 |
| 16 QAM | % | 12.5 | 12.5 |
| 64 QAM | % | 8.0 | 8.0 |

In some embodiments, EVM may be used for single antenna transmissions.

Figure 4:
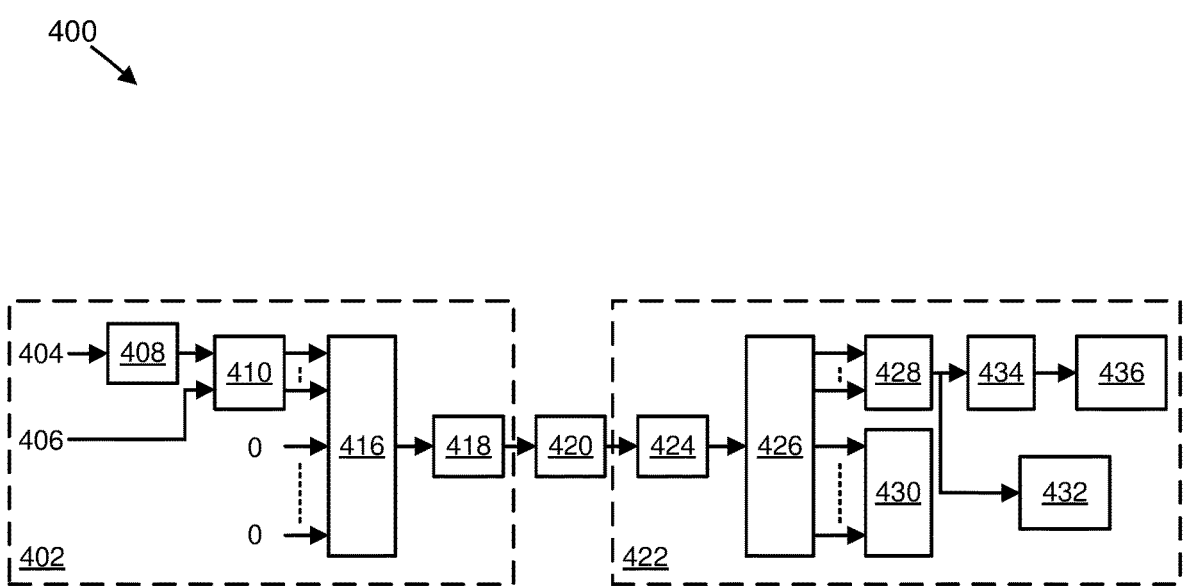
FIG. 4 is a schematic flowchart diagram illustrating one embodiment of EVM measurement points.

FIG. 4 is a schematic flowchart diagram 400 illustrating one embodiment of EVM measurement points. The diagram 400 includes a device under test ("DUT") 402. A first input 404 (e.g., discrete Fourier transform spread orthogonal frequency division multiplexing ("DFT-s-OFDM"), physical uplink shared channel ("PUSCH"), physical uplink control channel ("PUCCH")) and a second input 406 (e.g., cyclic prefix orthogonal frequency division multiplexing ("CP-OFDM"), PUSCH, PUCCH, demodulation reference signal ("DM-RS")) are provided to the DUT 402. Specifically, the first input 404 is provided to a discrete Fourier transform ("DFT") 408 which has an output provided to a tone map 410. The second input 406 is also provided to the tone map 410. The tone map 410 provides outputs to an inverse fast Fourier transform ("IFFT") 416. Moreover, the IFFT 416 provides an output to a front-end transmitter ("TX") 418. The front-end TX 418 outputs data over a channel 420 that provides data to a test equipment 422. The test equipment 422 performs radio frequency correction 424. The radio frequency correction 424 outputs data to a fast Fourier transform ("FFT") 426, which outputs data to a TX receiver ("RX") chain equalizer 428 and an in-band emissions element 430. The transmitter-receiver ("TX-RX") chain equalizer 428 outputs a first output 432 (e.g., CP-OFDM PUSCH, PUCCH, DM-RS), and data to an inverse discrete Fourier transform ("IDFT") 434 which outputs a second output 436 (e.g., DFT-s-OFDM PUSCH, PUCCH).

In various embodiments, EVM may be measured independently for two transmit antenna connectors (e.g., not ports) in a conductive test. In certain embodiments, EVM may be tested with two transmitter chains turned on. However, in such embodiments, a linear coupling between two antennas may be significant, and it may not be possible to measure EVM independently for the two transmitter chains since the linear coupling from a second transmit chain interfering with a first transmitter chain will likely cause the first transmitter chain to incorrectly fail EVM.

In some embodiments, EVM may be defined for any precoding matrix. In various embodiments, EVM at user equipment ("UE") antenna connectors relate to EVM observed at a UE for a given layer. In certain embodiments, a transmitter EVM observed at a gNB may be evaluated for three different receivers—a single antenna receiver, a two antenna receiver using normalized maximum ratio combining, and a multi-layer multiple input multiple output ("MIMO") receiver for which an output for a second (e.g., non-transmitted) layer is ignored. In such embodiments, only for a last receiver can it be shown that the transmitter EVM observed at the gNB receiver is a normalized linear combination of the EVM at UE antenna connectors. In some embodiments, a minimum mean square error ("MMSE") receiver may be biased so that EVM is underestimated. In such embodiments, if an MMSE receiver is used to measure EVM, then the EVM may be corrected to remove the effect of the receiver bias.

Figure 5:
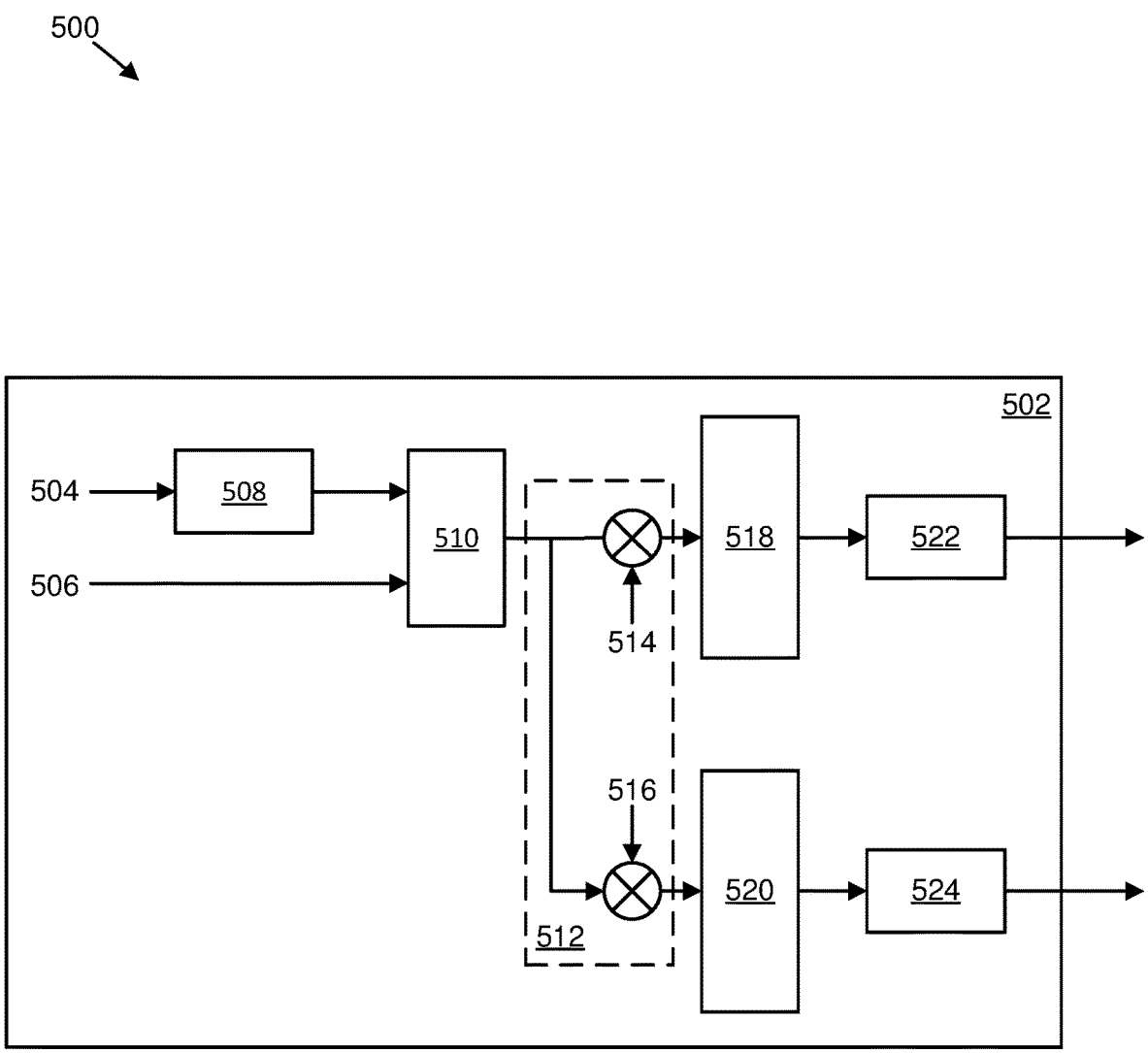
FIG. 5 is a schematic flowchart diagram illustrating one embodiment of a UE implementation of an antenna port or a single MIMO layer.

In certain embodiments, measurement of EVM may be made for an antenna port or a MIMO layer. FIG. 5 shows a UE implementation of an antenna port or MIMO layer corresponding to two physical antennas. In embodiments similar to those in FIG. 5, complex-valued antenna weights may be applied to all subcarriers, or different complex-valued antenna weights may be applied to each subcarrier or to each resource block ("RB").

In various embodiments, EVM observed at a gNB receiver (e.g., without noise) may depend on a number of receive antennas at the gNB and a type of receiver that the gNB uses. In such embodiments, because a single layer transmission can be received with a single receive antenna, the EVM is evaluated at the gNB with both one receive antenna and two receive antennas.

FIG. 5 is a schematic flowchart diagram 500 illustrating one embodiment of a UE implementation of an antenna port or a single MIMO layer. The diagram 500 includes a DUT 502. A first input 504 (e.g., DFT-s-OFDM, PUSCH, PUCCH) and a second input 506 (e.g., CP-OFDM, PUSCH, PUCCH, DM-RS) are provided to the DUT 502. Specifically, the first input 504 is provided to a DFT 508 which has an output provided to a tone map 510. The second input 506 is also provided to the tone map 510. The tone map 510 provides outputs to a port or layer mapping 512 having inputs $W_{1,1}$ 514 and $W_{2,1}$ 516. The outputs of the port or layer mapping 512 are provided to a first IFFT 518 and a second IFFT 520. Moreover, the first IFFT 518 provides a first output 522 (e.g., to a first front end transmitter), and the second IFFT 520 provides a second output 524 (e.g., to a second front end transmitter).

In some embodiments, a method for measuring EVM is for test equipment to apply one of two options to measure the EVM.

In a first option, a normalized maximum ratio combining receiver (e.g., minimum norm solution) is given by:

$$\hat{x} = \frac{(Hw)^H}{Hw(Hw)^H} y,$$

where H is a 2×2 channel matrix and w is a precoding vector that is used to form an antenna port or MIMO layer. In the first option, a transmitter noise observed at an output of a gNB receiver is given by:

$$v = \frac{w^H H^H H}{w^H H^H Hw} n = cn,$$

where v is the transmitter noise at the output of receiver. The resulting magnitude of the noise combining vector c is given by:

$$\|c\| = \left\| \frac{w^H H^H H}{w^H H^H Hw} \right\|,$$

from which it may not be immediately clear whether $\|c\| \leq 1$ or if $\|c\|$ is greater than 1. As a result, it may not be clear whether it can be said that $var(v) \leq max(var(n_1), var(n_2))$.

For a minimum-norm linear unbiased receiver, a transmitter noise observed at a noiseless gNB receiver for a single layer transmission depends on the channel H and the precoding vector w. It may not be immediately clear if it can be said that $var(v) \leq max(var(n_1), var(n_2))$ or if the observed transmitter noise may be larger than this.

In a second option, a linear zero-forcing MIMO receiver where only the first output, corresponding to the MIMO layer that is transmitted, is used. The second output corresponds to a precoding vector that is orthogonal to the first output and corresponds to a second layer that is not transmitted. In one embodiment of the second option, a method for evaluating EVM is to use a multi-layer MIMO receiver, even though the second layer is not present. With this approach, the matrix precoder W given by $$W = \begin{bmatrix} W_1 \\ W_2 \end{bmatrix}$$

is chosen where the 1×2 precoding vector $w_1$ is used to transmit a single layer of data and the 1×2 matrix $w_2$ has unit norm and is orthogonal to $w_1$. If the channel H has full rank, the data may be estimated as $\hat{x} = W^{-1} H^{-1} y = W^{-1} H^{-1} H(W x+n) = x + W^{-1} n = x+v$, where $v = W^{-1} nv = W^H n$, and where the second outputs of $\hat{x} = [\hat{x}_1 \ \hat{x}_2]^T$ and $v = [v_1 \ v_2]^T$ are ignored. With this approach, the EVM measured at the first output is given by $v_1 = w_1 * n$.

So, with a MIMO receiver for a single-layer transmission, the EVM observed at a gNB receiver is the same as for a two-layer transmission. A relationship between the transmit EVM at the UE antenna connectors and the transmit EVM observed at the gNB receiver may be the same as in other embodiments.

In certain embodiments, if a linear zero-forcing MIMO receiver is used to measure EVM for a port or single layer transmission, test equipment may require knowledge of a precoding vector $w_1$ so that it may determine an orthogonal basis vector $w_2$. In such embodiments, the test equipment may require that reference symbols be sent with the precoder $w_2$ so that the channel H $w_2$ may be measured.

In some embodiments, since a transmitter may have a frequency dependence across a channel due to filters, a receiver, either normalized maximum ratio or zero-forcing, may be computed separately for each subcarrier. For OFDM modulation, a mean-squared error may be computed as a square of an absolute value of a difference between an output of the receiver for each subcarrier and a corresponding known modulation symbol for a given subcarrier, averaged over all subcarriers of all allocated RB's. A normalized mean-squared error may be the mean-squared error divided by the mean-squared value of the modulated symbols for the subcarriers of all allocated RB's. The EVM may be computed as a percentage as the square-root of the normalized mean-squared error multiplied by 100.

In various embodiments, prior to FFT used to demodulate, a $LO_{[MB][FC2]}$ leakage may be removed from each transmit chain.

In certain embodiments, for DFT-s-OFDM, a zero-forcing MIMO receiver may be used to get a symbol estimate for each subcarrier. However, in such embodiments, after the zero-forcing MIMO receiver is applied, an IDFT is applied to the symbol estimates for the subcarriers of the allocated RB's to form estimates of modulated data symbols. EVM may then be computed based on a normalized mean-square error of the differences between the output of the IDFT and the known data symbols.

In some embodiments, a first method may provide an EVM definition per port as opposed to an EVM definition per antenna. It should be noted that, in various embodiments herein described in relation to a port, may be applied to any number of antennas. A normalized maximum ratio combiner may be defined for any number of receive antennas. To extend a zero-forcing MIMO receiver to more antennas, a precoding matrix must have full rank, though only the output corresponding to one layer may be used. Additional precoding vectors may be any set of orthonormal vectors orthogonal to a precoding vector used to form a port or MIMO layer. For test equipment to measure a full channel, it may be necessary for reference symbols to be transmitted using each of the orthogonal precoding vectors used to define a zero-forcing MMSE receiver.

In the absence of coupling that depends on a precoder, a measured EVM may be independent of the precoder that is used to measure the EVM. However, if this is not the case, then it may be necessary to consider averaging an EVM measurement over multiple precoders, or to take a maximum value over all precoders.

As may be appreciated, there may be several possible methods for setting and measuring an EVM requirement.

In one embodiment, a first method may set and measure an EVM requirement at UE antenna connectors in accordance with a desired noise and/or error floor for the modulation type. As may be appreciated, an advantage of the first method may be that it is simple. A disadvantage of the first method may be that it may not be clear how the EVM at a transmitter maps to a transmitter noise observed at an output of a noiseless gNB receiver. Also, the first method may not address a possibility that noise at antenna connectors may be correlated and/or depend on a precoder w.

In various embodiments, a second method may set and measure an EVM requirement at the at an output of a minimum norm linear unbiased receiver. As may be appreciated, an advantage of the second method may be that the second method measures the EVM at the output of the receiver and addresses any correlation or precoder dependence of the transmitter noise at the antenna connectors. A disadvantage of the second method may be that a result depends on a propagation channel H.

Figure 6:
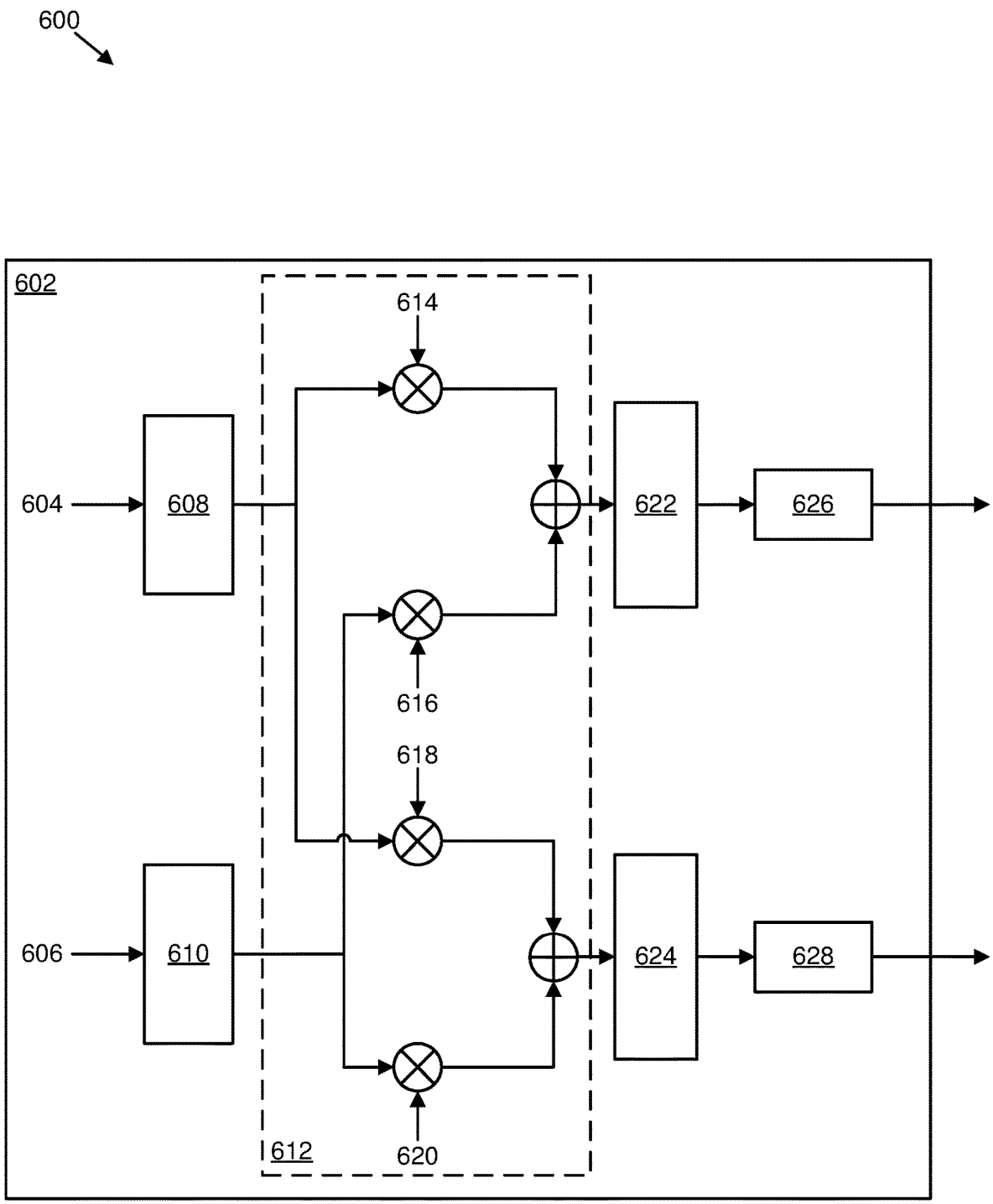
FIG. 6 is a schematic flowchart diagram illustrating one embodiment of a UE implementation of a two-layer MIMO transmission.

In some embodiments, a third method may set and measure an EVM requirement at the at an output of a linear zero-forcing MIMO receiver. As may be appreciated, an advantage of the third method may be that it measures the EVM at the output of the receiver and thus addresses any correlation or precoder dependence of the transmitter noise at the antenna connectors. Furthermore, with the third method, the result is independent of the propagation channel so long as the matrix has full rank. Disadvantages of the third method may be that i) the precoding vector w must be known by the test equipment to compute an orthogonal basis vector, and (ii) it may be necessary to send some reference symbols with the orthogonal precoder to measure the corresponding channel In various embodiments, measurement of EVM may be for a multi-layer MIMO transmission. FIG. 6 shows one embodiment of a UE implementation of a two-layer MIMO transmission. The transmitted signal is given by: W x+n, where W is a rank-2 precoder, the data vector x includes two data symbols so that $x^T=[x_1\ x_2]$, and $n^T=[n_1\ n_2]$ is the transmitter noise at the two antenna connectors. To receive a two-layer MIMO transmission, it may be assumed that a gNB has at least two receive antennas. Since the UE transmitter noise also passes through a propagation channel, a signal received by a gNB without receiver noise is given by y=H (W x+n), where H is the channel matrix given $$by = \begin{bmatrix} h_{1,1} & h_{1,2} \\ h_{2,1} & h_{2,2} \end{bmatrix},$$

and $h_{ij}$ denotes a complex gain to the i-th receive antenna from the j-th transmit antenna.

FIG. 6 is a schematic flowchart diagram 600 illustrating one embodiment of a UE implementation of a two-layer MIMO transmission. The diagram 600 includes a DUT 602. A first input 604 (e.g., CP-OFDM, PUSCH, PUCCH, DM-RS) and a second input 606 (e.g., CP-OFDM, PUSCH, PUCCH, DM-RS) are provided to the DUT 602. Specifically, the first input 604 is provided to a first tone map 608, and the second input 506 is provided to a second tone map 610. The first tone map 608 and the second tome map 610 provide outputs to a layer mapping 612 having inputs $W_{1,1}$ 614, $W_{1,2}$ 616, $W_{2,1}$ 618, and $W_{2,2}$ 620. The outputs of the layer mapping 612 are provided to a first IFFT 622 and a second IFFT 624. Moreover, the first IFFT 622 provides a first output 626 (e.g., to a first front end transmitter), and the second IFFT 624 provides a second output 628 (e.g., to a second front end transmitter).

In certain embodiments, a linear MMSE MIMO receiver may be biased except if a signal-to-noise ratio becomes infinite, and thus if the signal-to noise ratio becomes infinite the linear MMSE MIMO receiver should not be used for the purpose of measuring the transmitter EVM.

In some embodiments, a linear MMSE MIMO receiver may be biased so that an expected value of $\hat{x}$ is not equal to x, and as a result, use of the linear MMSE MIMO receiver will result in an underestimate of the true EVM. To get a correct measurement, a linear zero-forcing MIMO receiver should be used since the resulting estimate $\hat{x}$ of the data vector x is unbiased so that the expected value of $\hat{x}$ is equal to x.

In various embodiments, for a multi-layer transmission, a zero-forcing MIMO receiver is given by $\hat{x}=((HW)^H HW)^{-1} (H\ W)^H\ y$, where W is the precoding matrix and H is the channel matrix. Because the number of transmit and receive antennas are equal, this may be simplified as: $\hat{x}=W^{-1}H^{-1} y=W^{-1}H^{-1}H(W\ x+n)=W^{-1}(W\ x+n)=x+W^{-1}n$. Since $W^{-1}=W^H$, the error vector $v=[v_1\ v_2]^T$ at the gNB receiver is given by: $v=W^H\ n$, $$v_1 = [w^*_{1,1}\ w^*_{2,1}]\begin{bmatrix}n_1\\n_2\end{bmatrix},$$

and $$v_2 = [w^*_{1,2}\ w^*_{2,2}]\begin{bmatrix}n_1\\n_2\end{bmatrix}.$$

In certain embodiments, a transmitter EVM observed for each MIMO layer at a gNB receiver without noise may be independent of a channel between a UE and a gNB if the channel H has full rank. In some embodiments, a transmitter EVM observed for each MIMO layer at a gNB receiver without noise may be a function of the EVM at antenna connectors and a precoder W used to generate the MIMO layers.

In various embodiments, because all precoding vectors are normalized to a unit norm, it may be true that: $var(v_1) \leq max(var(n_1), var(n_2))$ and $var(v_2) \leq max(var(n_1), var(n_2))$, so long as a noise $n_1$ and $n_2$ at the transmitter connectors are uncorrelated, and thus it may be sufficient to specify an EVM at antenna connectors. However, in such embodiments, it may not be certain that a noise $n_1$ and $n_2$ are uncorrelated, and it may not be certain that noise variances $var(n_1)$ and $var(n_2)$ are independent of a precoding matrix W. So, in such embodiments, for it to be sufficient to specify EVM independently at the antenna connectors, the following two conditions should be met: 1) a first condition is that the variances of noise processes $n_1$ and $n_2$ at the antenna connectors must be independent of the precoding matrix W; and 2) a second condition is that the noise processes $n_1$ and $n_2$ must be uncorrelated regardless of which precoding matrix W is used. With respect to the first condition, due to in-device coupling and non-linearities in the transmit chains, it may not be obvious that it can be assumed that the variance of $n_1$ and $n_2$ are independent of the precoder W, and as a result, the first condition should be verified. Similarly, for the second condition, it should be verified that that the noise processes $n_1$ and $n_2$ are uncorrelated regardless of which precoding matrix W is used.

In certain embodiments, unless it can be verified that noise processes at antenna connectors are independent of each other and independent of a precoder W used to generate MIMO layers, a linear zero-forcing MIMO receiver may be used to measure EVM per layer.

Figure 7:
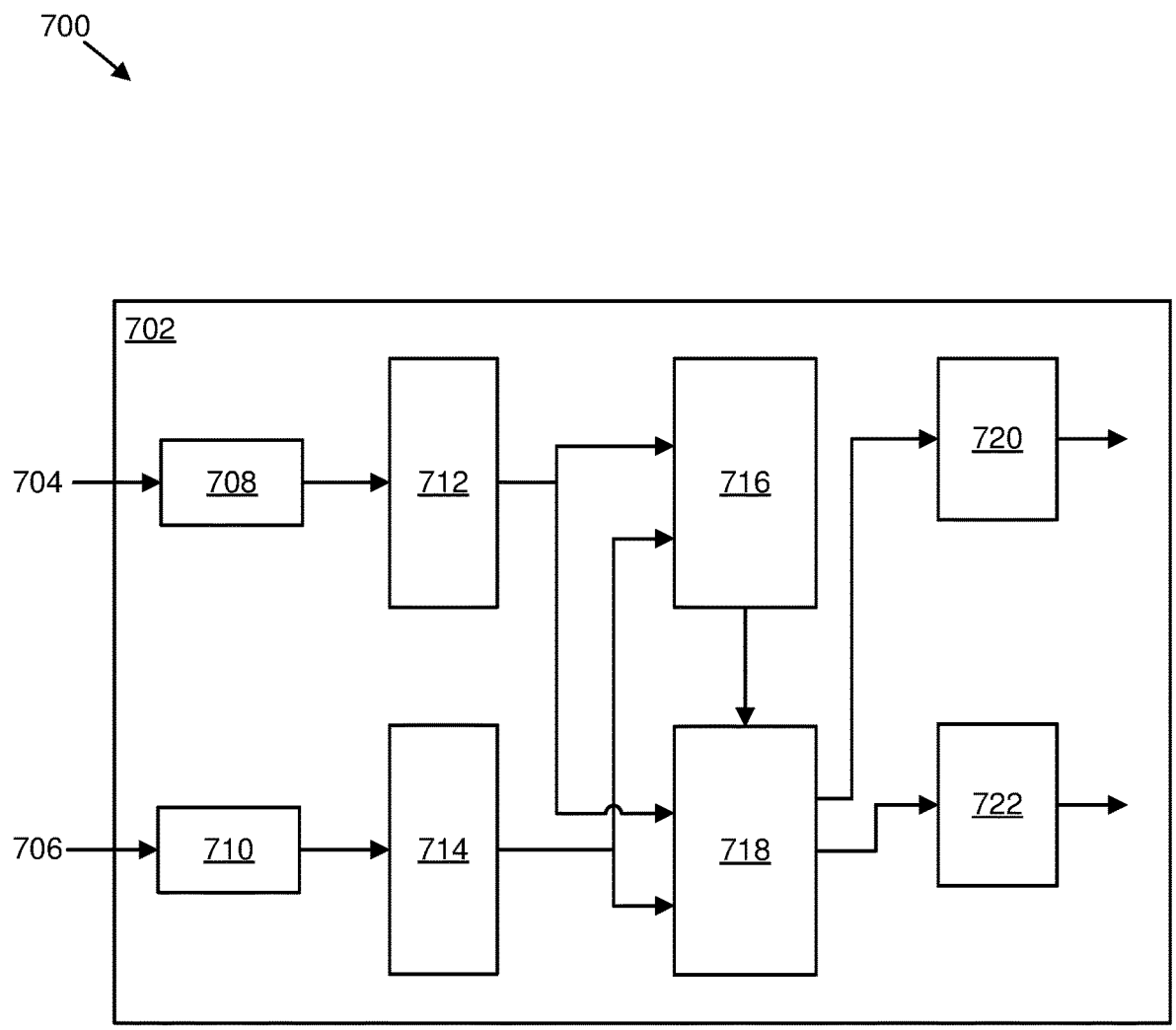
FIG. 7 is a schematic flowchart diagram illustrating one embodiment of a per layer TX EVM measurement for multi-layer MIMO.

One embodiment of method for using a linear zero-forcing MIMO receiver to measure EVM per layer is shown in FIG. 7. With the embodiment of FIG. 7, outputs of FFT's may be provided to both a channel estimator and to a linear zero-forcing MIMO receiver. Moreover, for each subcarrier output of each FFT, a channel estimator correlates with corresponding data symbols to form an estimate of a product HW of a channel matrix H and a precoder W. Since correlation with the data measures the product HW, test equipment may not need to know which precoder W is used to measure EVM.

FIG. 7 is a schematic flowchart diagram 700 illustrating one embodiment of a per layer TX EVM measurement for multi-layer MIMO. The diagram 700 includes a test equipment 704 that receives a first input 704 and a second input 706. Moreover, the first input 704 is provided to a first radio frequency ("RF") correction device 708, and the second input 706 is provided to a second RF correction device 710. The first RF correction device 708 outputs data to a first FFT 712, and the second RF correction device 710 outputs data to a second FFT 714. Moreover, the first FFT 712 and the second FFT 714 provide outputs to a channel estimation device 716 and a linear zero-forcing MIMO receiver 718. The linear zero-forcing MIMO receiver 718 provides outputs to a first inverse tone map 720 and a second inverse tone map 722. Moreover, the first inverse tone map 720 outputs layer 1 EVM (e.g., CP-OFDM, PUSCH, PUCCH, DM-RS). Further, the second inverse tone map 722 outputs layer 2 EVM (e.g., CP-OFDM, PUSCH, PUCCH, DM-RS).

In some embodiments, a linear unbiased estimate $\hat{x}$ of a vector data symbol x for first and second layers of a given subcarrier is given by: $\hat{x}=(H\ W)^{-1}\ y$, where y is a vector output of two FFT's for a given subcarrier, where $y=[y_1\ y_2]^T$ are the outputs of the first and second FFT for the given subcarrier. Errors for the symbols on the first and second layer are computed as $|x_1-\hat{x}_1|$ and $|x_2-\hat{x}_2|$ and a square-root of the sum of the squares of these errors over frequency may be normalized and used to compute EVM for the first and second layers. It should be noted that, prior to the FFT used to demodulate, the LO leakage may be removed from each transmit chain In various embodiments, for CP-OFDM modulation, EVM may be computed for each layer in a manner similar to that for single layer transmission. The EVM requirement may then be applied to each layer separately, or the requirement may be applied after averaging between layers.

In certain embodiments, for multi-layer transmissions, there may be no need to consider DFT-s-OFDM modulation as it is not allowed.

In some embodiments, depending on an amount of coupling (e.g., linear and otherwise) between transmit chains, it may be possible that an EVM will depend on a precoder, so it may be considered whether an EVM requirement should be evaluated for multiple multi-layer precoders, and whether an average or a maximum EVM should be used in setting the requirement.

It should be noted that various embodiments described herein for defining EVM may be applied to an arbitrary numbers of antennas and to any number of layers less than or equal to the number of antennas.

In various embodiments, EVM measured using an MMSE receiver may be converted to the MMSE for an unbiased receiver.

In certain embodiments, a linear MMSE receiver may be used to estimate EVM for multi-layer MIMO transmissions. However, the MMSE receiver may be a biased receiver in that an expected value of $\hat{x}$ equal to x. As a result, the signal-to-noise ratio for an MMSE receiver may overestimate a true signal-to-noise ratio, and as a result, may underestimate the EVM. In particular, for an MMSE receiver: $SNR_{MMSE}=SNR+1$. From this, it can be shown that:

$$\sigma^2_{unbiased} = \frac{\sigma^2_{MMSE}}{1-\sigma^2_{MMSE}}.$$

Since, EVM is the square root of the normalized mean-square error multiplied by 100, it follows that:

$$EVM_{unbiased} = 100\sqrt{\sigma^2_{unbiased}} = 100\sqrt{\frac{\sigma^2_{MMSE}}{1-\sigma^2_{MMSE}}} = 100\sqrt{\frac{(EVM_{MMSE}/100)^2}{1-(EVM_{MMSE}/100)^2}}.$$

Thus, if an MMSE receiver is used to measure the EVM for the transmitter, the EVM must be adjusted as follows:

$$EVM_{unbiased} = 100\sqrt{\frac{(EVM_{MMSE}/100)^2}{1-(EVM_{MMSE}/100)^2}}.$$

Figure 8:
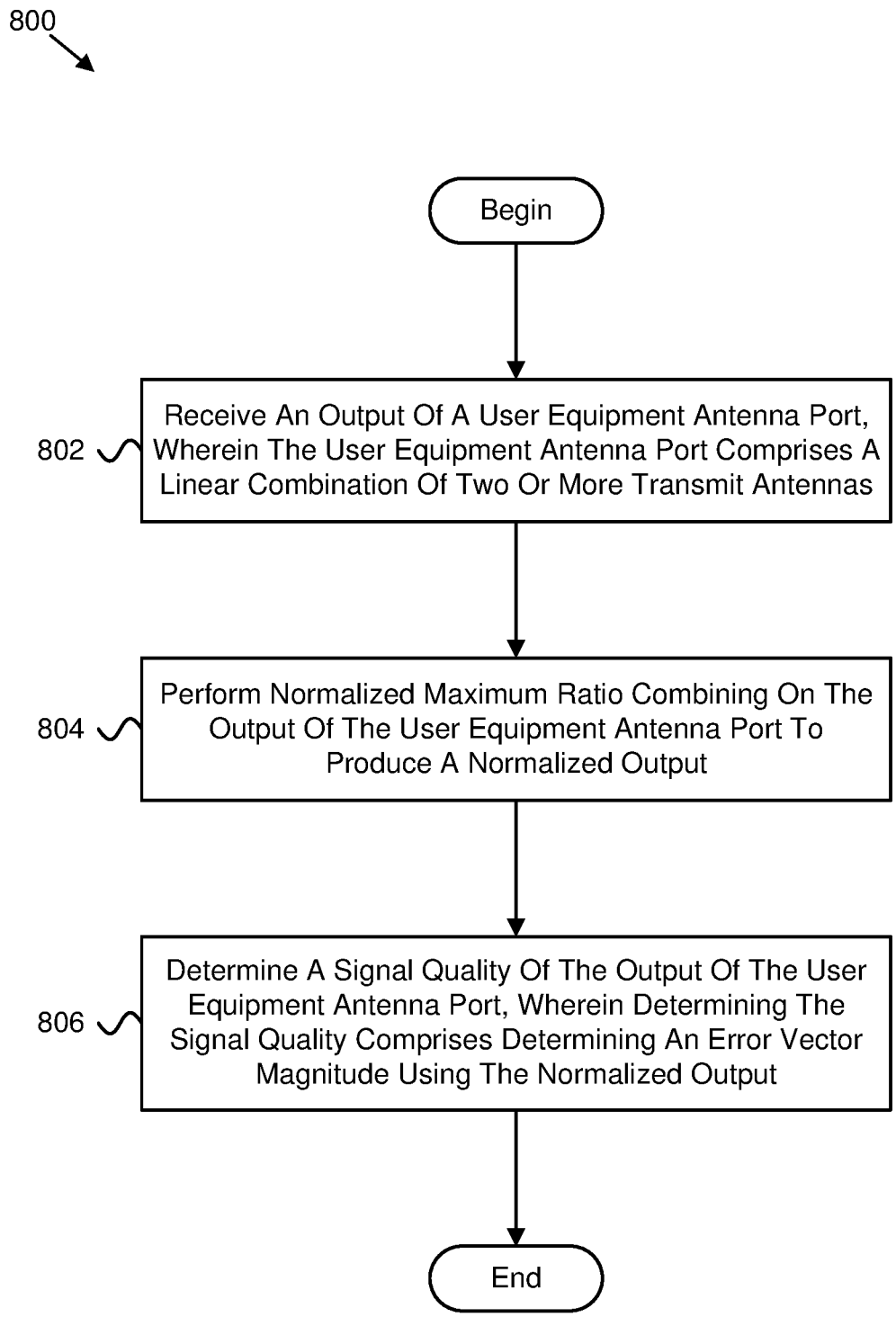
FIG. 8 is a flow chart diagram illustrating one embodiment of a method for determining a signal quality using an error vector magnitude.

FIG. 8 is a flow chart diagram illustrating one embodiment of a method 800 for determining a signal quality using an error vector magnitude. In some embodiments, the method 800 is performed by an apparatus, such as the network unit 104 and/or test equipment. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 an output of a user equipment antenna port. The user equipment antenna port includes a linear combination of two or more transmit antennas. In some embodiments, the method 800 includes performing 804 normalized maximum ratio combining on the output of the user equipment antenna port to produce a normalized output. In certain embodiments, the method 800 includes determining 806 a signal quality of the output of the user equipment antenna port. Determining the signal quality includes determining an error vector magnitude using the normalized output.

In certain embodiments, receiving the output of the user equipment antenna port comprises receiving the output using a separate conductive path from each transmit antenna of the two or more transmit antennas. In some embodiments, receiving the output of the user equipment antenna port comprises receiving the output using receive antenna ports, and each receive antenna port of the receive antenna ports comprises a linear combination of one or more receive antennas.

In various embodiments, the normalized maximum ratio combining is given by $$\frac{(Hw)^H}{Hw(Hw)^H},$$

and wherein the vector w denotes linear combining weights comprising a transmit port, H is a channel matrix of dimension M×N, and a term Hij in an i-th column and j-th row denotes a complex gain of a channel from a j-th transmit antenna to an i-th receive port.

In one embodiment, a fast Fourier transform is computed for an output of each antenna connector. In certain embodiments, the normalized maximum ratio combining is performed for each subcarrier of each allocated resource block based a channel estimate for each subcarrier for each antenna connector. In some embodiments, the normalized maximum ratio combining performed for each subcarrier is applied to a result of the fast Fourier transform. In various embodiments, the error vector magnitude is determined by comparing known data symbols with the normalized output.

Figure 9:
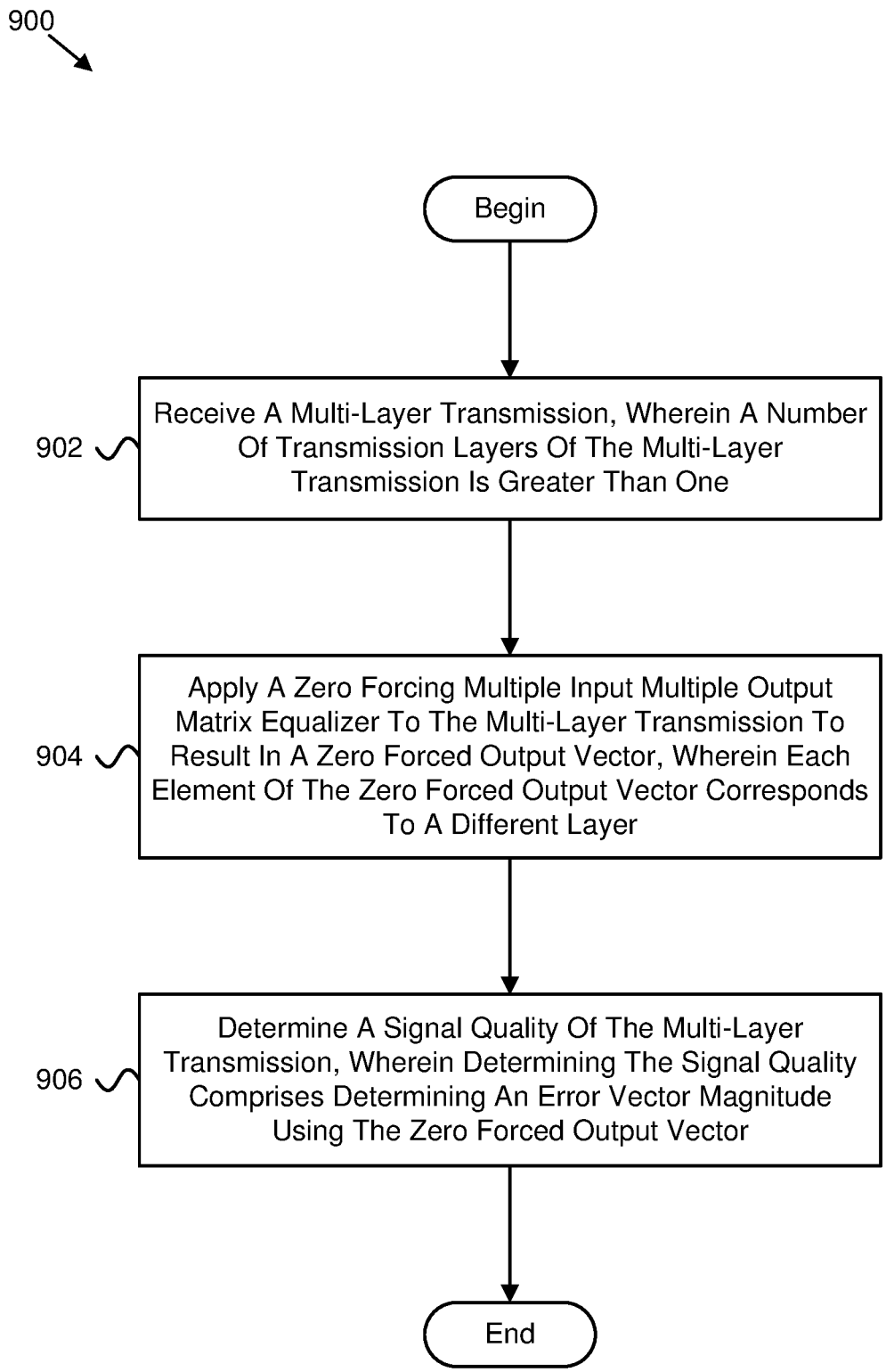
FIG. 9 is a flow chart diagram illustrating another embodiment of a method for determining a signal quality using an error vector magnitude.

FIG. 9 is a flow chart diagram illustrating another embodiment of a method 900 for determining a signal quality using an error vector magnitude. In some embodiments, the method 900 is performed by an apparatus, such as the network unit 104 and/or test equipment. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902 a multi-layer transmission. A number of transmission layers of the multi-layer transmission is greater than one. In some embodiments, the method 900 includes applying 904 a zero forcing multiple input multiple output matrix equalizer to the multi-layer transmission to result in a zero forced output vector. Each element of the zero forced output vector corresponds to a different layer. In certain embodiments, the method 900 includes determining 906 a signal quality of the multi-layer transmission. Determining the signal quality includes determining an error vector magnitude using the zero forced output vector.

In certain embodiments, receiving the multi-layer transmission comprises receiving the multi-layer transmission using a separate conductive path from each transmit antenna of at least two transmit antennas. In some embodiments, receiving the multi-layer transmission comprises receiving the multi-layer transmission using receive antenna ports, and each receive antenna port of the receive antenna ports comprises a linear combination of one or more receive antennas. In various embodiments, the zero forcing multiple input multiple output matrix equalizer is given by $(H W)^H (HW(HW)^H)^{-1}$, and wherein an i-th column of the matrix W denotes linear combining weights comprising an i-th transmit port, H is a channel matrix of dimension M×N, a term Hij in an i-th column and j-th row of H denotes a complex gain of a channel from a j-th transmit antenna to a i-th receive port, and M is greater than or equal to N.

In one embodiment, a fast Fourier transform is computed for an output of each antenna connector. In certain embodiments, zero forcing multiple input multiple output is performed for each subcarrier of each allocated resource block based on a channel estimate for each subcarrier for each antenna connector. In some embodiments, the zero forcing multiple input multiple output performed for each subcarrier is applied to a result of the fast Fourier transform.

In various embodiments, each output of the zero forced output vector corresponds to a different layer of the multi-layer transmission. In one embodiment, the error vector magnitude is determined for each layer of the multi-layer transmission by comparing known data symbols with the zero forced output. In certain embodiments, the signal quality is the average of the error vector magnitude for layers of the multi-layer transmission. In some embodiments, a figure of merit for a transmitter is a maximum of the error vector magnitude for layers of the multi-layer transmission.

In one embodiment, a method comprises: receiving an output of a user equipment antenna port, wherein the user equipment antenna port comprises a linear combination of two or more transmit antennas; performing normalized maximum ratio combining on the output of the user equipment antenna port to produce a normalized output; and determining a signal quality of the output of the user equipment antenna port, wherein determining the signal quality comprises determining an error vector magnitude using the normalized output.

In certain embodiments, receiving the output of the user equipment antenna port comprises receiving the output using a separate conductive path from each transmit antenna of the two or more transmit antennas.

In some embodiments, receiving the output of the user equipment antenna port comprises receiving the output using receive antenna ports, and each receive antenna port of the receive antenna ports comprises a linear combination of one or more receive antennas.

In various embodiments, the normalized maximum ratio combining is given by $$\frac{(Hw)^H}{Hw(Hw)^H},$$

and wherein the vector w denotes linear combining weights comprising a transmit port, H is a channel matrix of dimension M×N, and a term Hij in an i-th column and j-th row denotes a complex gain of a channel from a j-th transmit antenna to an i-th receive port.

In one embodiment, a fast Fourier transform is computed for an output of each antenna connector.

In certain embodiments, the normalized maximum ratio combining is performed for each subcarrier of each allocated resource block based a channel estimate for each subcarrier for each antenna connector.

In some embodiments, the normalized maximum ratio combining performed for each subcarrier is applied to a result of the fast Fourier transform.

In various embodiments, the error vector magnitude is determined by comparing known data symbols with the normalized output.

In one embodiment, an apparatus comprises: a receiver that receives an output of a user equipment antenna port, wherein the user equipment antenna port comprises a linear combination of two or more transmit antennas; and a processor that: performs normalized maximum ratio combining on the output of the user equipment antenna port to produce a normalized output; and determines a signal quality of the output of the user equipment antenna port, wherein determining the signal quality comprises determining an error vector magnitude using the normalized output.

In certain embodiments, the receiver receiving the output of the user equipment antenna port comprises the receiver receiving the output using a separate conductive path from each transmit antenna of the two or more transmit antennas.

In some embodiments, the receiver receiving the output of the user equipment antenna port comprises the receiver receiving the output using receive antenna ports, and each receive antenna port of the receive antenna ports comprises a linear combination of one or more receive antennas.

In various embodiments, the normalized maximum ratio combining is given by $$\frac{(Hw)^H}{Hw(Hw)^H},$$

and wherein the vector w denotes linear combining weights comprising a transmit port, H is a channel matrix of dimension M×N, and a term Hij in an i-th column and j-th row denotes a complex gain of a channel from a j-th transmit antenna to an i-th receive port.

In one embodiment, a fast Fourier transform is computed for an output of each antenna connector.

In certain embodiments, the normalized maximum ratio combining is performed for each subcarrier of each allocated resource block based a channel estimate for each subcarrier for each antenna connector.

In some embodiments, the normalized maximum ratio combining performed for each subcarrier is applied to a result of the fast Fourier transform.

In various embodiments, the error vector magnitude is determined by comparing known data symbols with the normalized output.

In one embodiment, a method comprises: receiving a multi-layer transmission, wherein a number of transmission layers of the multi-layer transmission is greater than one; applying a zero forcing multiple input multiple output matrix equalizer to the multi-layer transmission to result in a zero forced output vector, wherein each element of the zero forced output vector corresponds to a different layer; and determining a signal quality of the multi-layer transmission, wherein determining the signal quality comprises determining an error vector magnitude using the zero forced output vector.

In certain embodiments, receiving the multi-layer transmission comprises receiving the multi-layer transmission using a separate conductive path from each transmit antenna of at least two transmit antennas.

In some embodiments, receiving the multi-layer transmission comprises receiving the multi-layer transmission using receive antenna ports, and each receive antenna port of the receive antenna ports comprises a linear combination of one or more receive antennas.

In various embodiments, the zero forcing multiple input multiple output matrix equalizer is given by $(H\ W)^H(HW\ (HW)^H)^{31\ 1}$, and wherein an i-th column of the matrix W denotes linear combining weights comprising an i-th transmit port, H is a channel matrix of dimension M×N, a term Hij in an i-th column and j-th row of H denotes a complex gain of a channel from a j-th transmit antenna to a i-th receive port, and M is greater than or equal to N.

In one embodiment, a fast Fourier transform is computed for an output of each antenna connector.

In certain embodiments, zero forcing multiple input multiple output is performed for each subcarrier of each allocated resource block based on a channel estimate for each subcarrier for each antenna connector.

In some embodiments, the zero forcing multiple input multiple output performed for each subcarrier is applied to a result of the fast Fourier transform.

In various embodiments, each output of the zero forced output vector corresponds to a different layer of the multi-layer transmission.

In one embodiment, the error vector magnitude is determined for each layer of the multi-layer transmission by comparing known data symbols with the zero forced output.

In certain embodiments, the signal quality is the average of the error vector magnitude for layers of the multi-layer transmission.

In some embodiments, a figure of merit for a transmitter is a maximum of the error vector magnitude for layers of the multi-layer transmission.

In one embodiment, an apparatus comprises: a receiver that receives a multi-layer transmission, wherein a number of transmission layers of the multi-layer transmission is greater than one; and a processor that: applies a zero forcing multiple input multiple output matrix equalizer to the multi-layer transmission to result in a zero forced output vector, wherein each element of the zero forced output vector corresponds to a different layer; and determines a signal quality of the multi-layer transmission, wherein determining the signal quality comprises determining an error vector magnitude using the zero forced output vector.

In certain embodiments, the receiver receiving the multi-layer transmission comprises the receiver receiving the multi-layer transmission using a separate conductive path from each transmit antenna of at least two transmit antennas.

In some embodiments, the receiver receiving the multi-layer transmission comprises the receiver receiving the multi-layer transmission using receive antenna ports, and each receive antenna port of the receive antenna ports comprises a linear combination of one or more receive antennas.

In various embodiments, the zero forcing multiple input multiple output matrix equalizer is given by $(H\ W)^H(HW\ (HW)^H)^{31\ 1}$, and wherein an i-th column of the matrix W denotes linear combining weights comprising an i-th transmit port, H is a channel matrix of dimension M×N, a term Hij in an i-th column and j-th row of H denotes a complex gain of a channel from a j-th transmit antenna to a i-th receive port, and M is greater than or equal to N.

In one embodiment, a fast Fourier transform is computed for an output of each antenna connector.

In certain embodiments, zero forcing multiple input multiple output is performed for each subcarrier of each allocated resource block based on a channel estimate for each subcarrier for each antenna connector.

In some embodiments, the zero forcing multiple input multiple output performed for each subcarrier is applied to a result of the fast Fourier transform.

In various embodiments, each output of the zero forced output vector corresponds to a different layer of the multi-layer transmission.

In one embodiment, the error vector magnitude is determined for each layer of the multi-layer transmission by comparing known data symbols with the zero forced output.

In certain embodiments, the signal quality is the average of the error vector magnitude for layers of the multi-layer transmission.

In some embodiments, a figure of merit for a transmitter is a maximum of the error vector magnitude for layers of the multi-layer transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by an evaluation device, the method comprising:
   receiving an output from an antenna port, wherein the antenna port comprises a linear combination of two or more transmit antennas;
   performing normalized maximum ratio combining on the output of the antenna port to produce a normalized output; and
   determining a signal quality of the output of the antenna port, wherein determining the signal quality comprises determining an error vector magnitude using the normalized output.

2. The method of claim 1, wherein receiving the output of the antenna port comprises receiving the output using a separate conductive path from each transmit antenna of the two or more transmit antennas.

3. The method of claim 1, wherein receiving the output of the antenna port comprises receiving the output using receive antenna ports, and each receive antenna port of the receive antenna ports comprises a linear combination of one or more receive antennas.

4. The method of claim 1, wherein the normalized maximum ratio combining is given by $$\frac{(Hw)^H}{(Hw^H)Hw},$$

and wherein a vector w denotes linear combining weights comprising a transmit port, H is a channel matrix, and a term Hij in an i-th column and j-th row denotes a complex gain of a channel from a j-th transmit antenna to an i-th receive port.

5. The method of claim 1, wherein a fast Fourier transform is computed for an output of each antenna connector.

6. The method of claim 5, wherein the normalized maximum ratio combining is performed for each subcarrier of each allocated resource block based a channel estimate for each subcarrier for each antenna connector.

7. The method of claim 6, wherein the normalized maximum ratio combining performed for each subcarrier is applied to a result of the fast Fourier transform.

8. The method of claim 7, wherein the error vector magnitude is determined by comparing known data symbols with the normalized output.

9. An evaluation device, comprising:
   at least one memory; and
   at least one processor coupled with the at least one memory and configured to cause the evaluation device to:
      receive an output from an antenna port, wherein the antenna port comprises a linear combination of two or more transmit antennas;
      perform normalized maximum ratio combining on the output of the antenna port to produce a normalized output; and
      determine a signal quality of the output of the antenna port, wherein determining the signal quality comprises determining an error vector magnitude using the normalized output.

10. The evaluation device of claim 9, wherein the at least one processor is configured to cause the evaluation device to receive the output using a separate conductive path from each transmit antenna of the two or more transmit antennas.

11. The evaluation device of claim 9, wherein the at least one processor is configured to cause the evaluation device to receive the output using receive antenna ports, and each receive antenna port of the receive antenna ports comprises a linear combination of one or more receive antennas.

12. The evaluation device of claim 9, wherein the normalized maximum ratio combining is given by $$\frac{(Hw)^H}{(Hw^H)Hw},$$

denotes linear combining weights comprising a transmit port, H is a channel matrix, and a term Hij in an i-th column and j-th row denotes a complex gain of a channel from a j-th transmit antenna to an i-th receive port.

13. The evaluation device of claim 9, wherein a fast Fourier transform is computed for an output of each antenna connector.

14. The evaluation device of claim 13, wherein the normalized maximum ratio combining is performed for each subcarrier of each allocated resource block based a channel estimate for each subcarrier for each antenna connector.

15. The evaluation device of claim 14, wherein the normalized maximum ratio combining performed for each subcarrier is applied to a result of the fast Fourier transform.

16. The evaluation device of claim 15, wherein the error vector magnitude is determined by comparing known data symbols with the normalized output.

17. A processor for performing evaluations, comprising:
    at least one controller coupled with at least one memory and configured to cause the processor to:
       receive an output from an antenna port, wherein the antenna port comprises a linear combination of two or more transmit antennas;
       perform normalized maximum ratio combining on the output of the antenna port to produce a normalized output; and
       determine a signal quality of the output of the antenna port, wherein determining the signal quality comprises determining an error vector magnitude using the normalized output.

18. The processor of claim 17, wherein the at least one controller is configured to cause the processor to receive the output using a separate conductive path from each transmit antenna of the two or more transmit antennas.

19. The processor of claim 17, wherein the at least one controller is configured to cause the processor to receive the output using receive antenna ports, and each receive antenna port of the receive antenna ports comprises a linear combination of one or more receive antennas.

20. The processor of claim 17, wherein the normalized maximum ratio combining is given by $$\frac{(Hw)^H}{(Hw^H)Hw},$$

and wherein a vector w denotes linear combining weights comprising a transmit port, H is a channel matrix of dimension M×N, and a term Hij in an i-th column and j-th row denotes a complex gain of a channel from a j-th transmit antenna to an i-th receive port.

* * * * *